United States Patent [19]
Liu

[11] Patent Number: 6,023,158
[45] Date of Patent: Feb. 8, 2000

[54] SWITCH DRIVE CONTROLLER, METHOD OF OPERATION THEREOF AND POWER CONVERTER EMPLOYING THE SAME

[75] Inventor: Rui Liu, Plano, Tex.

[73] Assignee: Lucent Technologies Inc., Murray Hill, N.J.

[21] Appl. No.: 09/189,389

[22] Filed: Nov. 10, 1998

[51] Int. Cl.[7] ................................. G05F 5/00; G05F 1/613
[52] U.S. Cl. ......................... 323/351; 323/225; 323/299
[58] Field of Search ..................................... 323/222, 225, 323/282, 351, 299, 301; 363/124

[56] References Cited

U.S. PATENT DOCUMENTS 5,287,261  2/1994  Ehasni ...................................... 323/124
5,461,302  10/1995  Garcia et al. ............................ 323/222

*Primary Examiner*—Y. J. Han

[57] ABSTRACT

For use with a power converter coupled to a regulation circuit and having a power switch and an auxiliary switch coupled thereto, a controller, method of operating the power switch and auxiliary switch and a power converter employing the controller and method. In one embodiment, the controller includes a voltage conditioning network, parallel-coupled to the power switch, capable of sensing a voltage across the power switch and developing a conditioned voltage. The controller further includes a drive circuit, coupled to the voltage conditioning network, adapted to provide a drive signal to control the auxiliary switch as a function of the conditioned voltage and a regulation control signal from the regulation circuit.

20 Claims, 2 Drawing Sheets

SWITCH DRIVE CONTROLLER, METHOD OF OPERATION THEREOF AND POWER CONVERTER EMPLOYING THE SAME

TECHNICAL FIELD OF THE INVENTION

The present invention is directed, in general, to power conversion and, more specifically, to a switch drive controller for switches in a power converter, a method of controlling the switches and a power converter employing the controller or the method.

BACKGROUND OF THE INVENTION

Regulated DC power supplies are typically employed in analog and digital electronic systems. Two major categories of regulated DC power supplies are linear power supplies and switching power supplies. In linear power supplies, a transistor (operating in its active region) is provided in series with a transformer, e.g., a 60 Hz transformer, to provide electrical isolation between an input and an output and to provide the output in a desired voltage range.

In switching power supplies, transformation of a DC voltage from one level to another is accomplished with DC/DC converter circuits, such as step-down (buck) or step-up (boost) circuits. Solid-state devices, such as transistors, are operated as switches (either completely ON or completely OFF) within the switching converters. Since it is not necessary to operate the power devices in their active region, this mode of operation results in lower power dissipation. Furthermore, the increased switching speeds and higher voltage and current ratings of the power devices are some of the factors that have increased the popularity of switching power supplies.

Modern specifications for power supplies generally require operating efficiencies significantly above the specifications acceptable in the past. This is due, in part, to the stringent environments in which modern power supplies operate. The current environments require higher power supply densities and the amount of dissipated heat allowable is limited as compared with past environments. Accordingly, the individual components as well as the overall power supply must be more efficient.

A major source of power loss in switching power supplies is the losses associated with the individual components therein. One such component which is a major source of power dissipation is the semiconductor power switch. Power dissipation in the power switch is generally caused by the simultaneous occurrence of voltage across and current passing through the switch during its turn-off and turn-on transitions. For example, losses occur during the time intervals when the voltage across the switch reduces concurrently with a current flow through the switch. The power dissipation is a direct function of the current level passing through the power switch. With the recent trend of providing higher output currents from the power supplies, this has become an area of concern for power supply designers.

One approach for reducing the turn-on transition dissipation of the power switch is the use of snubber circuits to control the voltage and current of the power switch during switching transitions. The snubber circuits have been used very successfully in high output power supplies of the past. A characteristic of the conventional snubber circuit involves a voltage reduction time interval that is dependent on the amplitude of current flowing through the snubber circuit. Snubber circuits and circuits to control the operation thereof have been the subject of many references. For example, a driver circuit for the power switches and snubber switches of a switching power supply is disclosed in U.S. Pat. No. 5,461,302, issued Oct. 24, 1995, to Garcia, et al. ("Garcia"), which is herein incorporated by reference.

In Garcia, a latch circuit is employed to ensure the complementary switching operation of the power and an active snubber switch in the snubber circuit. The physical characteristics of the switching devices, however, increase the cost and complexity of the switch driver circuit. The drain-source voltage of the power switch has to be driven to zero or a threshold value before the power switch may be turned ON, i.e., conducting. Garcia employs multiple transistors in the latch circuit of the driver circuit to prevent malfunction of the power switch due to the ON resistance, i.e, Rdson, of the device. As a result, a significant voltage (drain-source voltage) may be induced across the power switch which may cause the latch circuit to malfunction. To reduce the risk of malfunction, a higher supply voltage must be employed in the latch circuit which, ultimately, increases the power losses associated therewith. Additionally, the latch circuit employs multiple switches (more specifically, three transistors) that increase the cost and complexity of the switch drive circuit.

Accordingly, what is needed in the art is an improved control system and switch driver circuit that controls the operation of a switch in a power converter that overcomes the deficiencies in the prior art.

SUMMARY OF THE INVENTION

To overcome the deficiencies of the prior art, the present invention provides, for use with a power converter coupled to a regulation circuit and having a power switch and an auxiliary switch coupled thereto, a controller, method of operating the power switch and auxiliary switch and a power converter employing the controller and method. In one embodiment, the controller includes a voltage conditioning network, parallel-coupled to the power switch, capable of sensing a voltage across the power switch and developing a conditioned voltage. The controller further includes a drive circuit, coupled to the voltage conditioning network, adapted to provide a drive signal to control the auxiliary switch as a function of the conditioned voltage and a regulation control signal from the regulation circuit.

The present invention, therefore, introduces the broad concept of developing a conditioned voltage associated with the power switch and controlling the auxiliary switch as a function thereof. In an embodiment to be illustrated and described, the voltage conditioning network reduces the sensed voltage across the power switch for use by the drive circuit to control the auxiliary switch. More specifically, a resistance across the drain and source terminals when the power switch is biased conducting may have a negative effect on the controller controlling the power and auxiliary switches. To minimize the deleterious effects of the power switch's ON resistance (Rdson), and, ultimately, the drain-source voltage across the power switch device on the drive circuit, the voltage conditioning network reduces the sensed drain-source voltage of the power switch. The conditioning of the sensed voltage across the power switch, prior to its introduction in the drive circuit, not only minimizes its effects on the drive circuit, but also allows the use of a less complex and least costly controller.

In one embodiment of the present invention, the drive circuit is adapted to provide another drive signal to control the power switch. The controller therefore is adapted to control the power and auxiliary switches concurrently.

In one embodiment of the present invention, the drive circuit induces the drive signal to turn on the auxiliary switch before the power switch turns on. Alternatively, the drive signal may turn on the power switch and turn off the auxiliary switch, respectively, when the regulation control signal goes high.

In one embodiment of the present invention, the auxiliary switch forms part of a snubber circuit. In an embodiment to be illustrated and described, the controller controls an auxiliary switch that forms a portion of an active snubber circuit. While the controller is particularly useful in snubber circuits, it is equally useful in converters having an auxiliary switch that is not part of a snubber circuit. Those skilled in the art, by the way, are familiar with the advantages associated with snubber circuits in power conversion technology.

In one embodiment of the present invention, the voltage conditioning network includes a voltage divider configuration. It should be readily apparent to those skilled in the art that reducing the voltage across the power switch may be accomplished with other circuit components and topologies. The present invention is not limited to any one particular voltage conditioning network.

In one embodiment of the present invention, the power switch and auxiliary switch are selected from the group consisting of metal-oxide-semiconductor field effect transistors (MOSFETs), insulated gate bipolar transistors (IGBTs) and gate turn-off thyristors (GTOs). Any switching device is within the broad scope of the present invention.

In one embodiment of the present invention, the drive circuit includes a drive switch coupled to first and second gate drivers of the power switch and the auxiliary switch, respectively. In an embodiment to be illustrated and described, the first and second gate drivers are coupled to drain and gate terminals of the drive switch, respectively, and the outputs of the first and second gate drivers are coupled to the power switch and the auxiliary switch, respectively.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
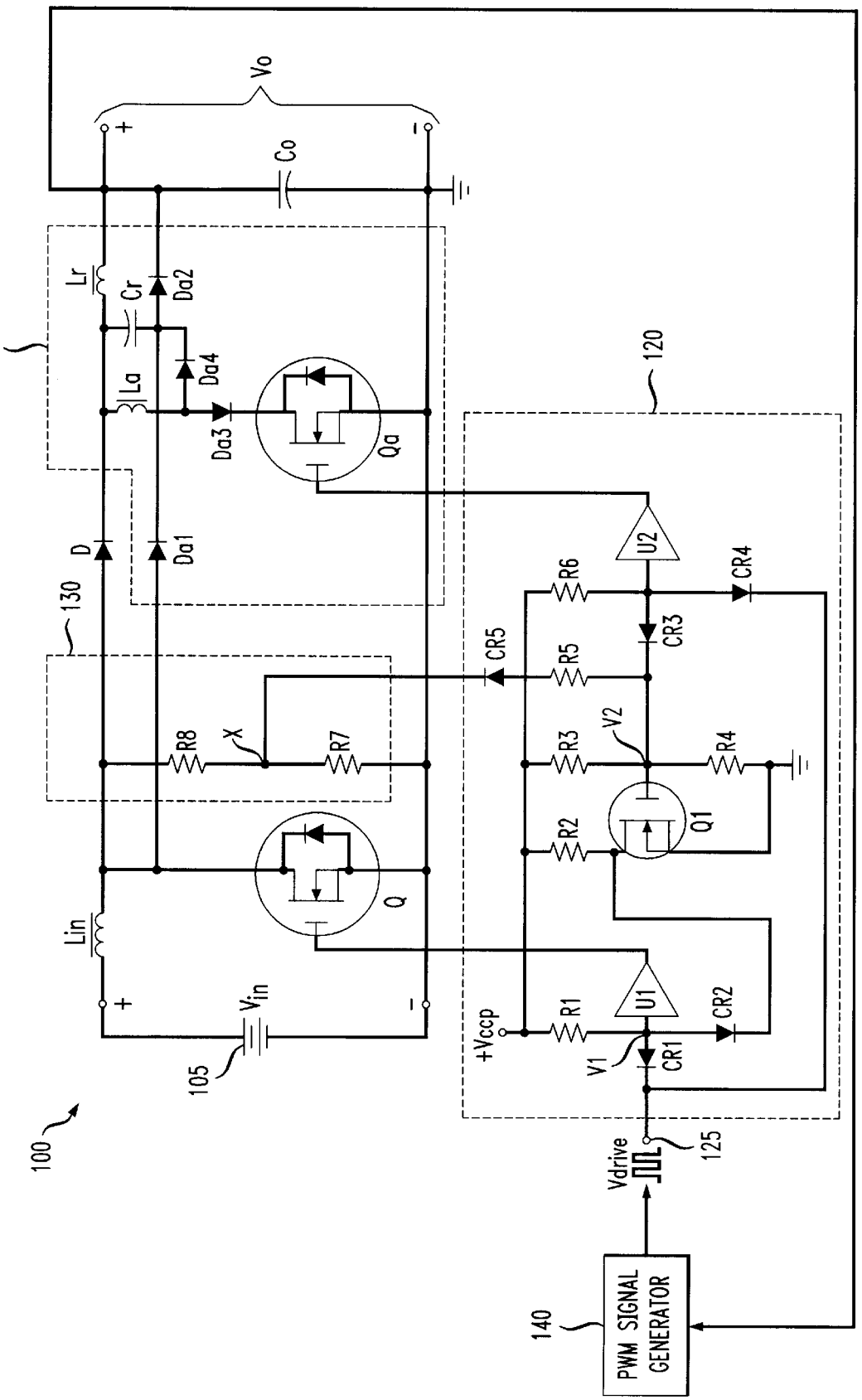
FIG. 1 illustrates a schematic diagram of an embodiment of a power converter constructed according to the principles of the present invention.

Referring initially to FIG. 1, illustrated is a schematic diagram of an embodiment of a power converter 100 constructed according to the principles of the present invention. Although a boost converter topology is illustrated in FIG. 1, the present invention is not limited to any particular type of switching power converter topology. The present invention may be advantageously employed in any switching power converter topology such as buck converters or buck-boost converters.

The power converter 100 includes an input inductor Lin, a power switch Q, a rectifier D and an output capacitor Co. The power converter 100 accepts a DC voltage Vin at its input from an input voltage source 105 and by biasing the power switch Q conductive, i.e., turned ON, a current is established through the input inductor Lin. Although, in the illustrated embodiment, the power switch Q is a metal-oxide-semiconductor field effect transistor is shown (MOSFET), those skilled in the art should readily appreciate that the present invention is not limited to any particular type of switching device. In other advantageous embodiments, the power switch Q may be, for instance, an insulated gate bipolar transistor (IGBT) or a gate turn-off thyristor (GTO).

The voltage polarity across the input inductor Lin and the low drain-source voltage (Vds) of the power switch Q reverse biases the rectifier diode D when the power switch Q is conducting. During the non-conducting cycle of the power switch Q, the rectifier diode D becomes forward biased and a current (due to the energy stored in the input inductor Lin) is conducted to an output. The power converter 100 also includes a snubber circuit 110 and a switch drive controller (or controller) coupled to the power switch Q.

A regulation circuit, such as a pulse width modulated (PWM) signal generator 140, senses an output voltage Vo and generates a PWM signal Vdrive to control the duty cycle of the power switch Q and, ultimately, maintain a regulated voltage level at the output of the power converter 100. The operation and construction of PWM controllers are well known in the art and will hereinafter not be described in detail. The present invention, however, is not limited to a PWM control scheme and other modulation schemes are within the broad scope of the present invention.

The snubber circuit 110 is employed to reduce the power dissipation in the power switch Q during, for instance, a turn-on transition. The snubber circuit 110 includes first, second, third and fourth snubber diodes Da1, Da2, Da3, Da4, first and second snubber inductors La, Lr, a snubber capacitor Cr and an auxiliary switch Qa. The snubber circuit 110 operates to reduce the power dissipated during the turn-on transition of the power switch Q by reducing the drain-source voltage (Vds) of the power switch Q to a low or substantially zero voltage before it is turned ON.

The snubber circuit 110 generally operates as follows. Beginning with the power switch Q and auxiliary switch in a nonconducting state, the auxiliary switch Qa is turned ON. The current through the input inductor Lin is carried by the rectifier diode D and the second snubber inductor Lr and the first and fourth snubber diodes Da1, Da4 are nonconducting as the voltage across the snubber capacitor Cr is substantially zero. When the auxiliary switch Qa is turned ON, the current in the first snubber inductor La begins to increase thereby discharging the drain-to-source voltage Vds of the power switch Q.

When the drain-to-source voltage Vds of the power switch Q reaches a substantially zero value, the power switch Q may be transitioned to a nonconducting state with moderate losses. Meanwhile, the current through the second snubber inductor Lr decreases (at a controlled rate) when the drain-to-source voltage Vds of the power switch Q reaches the substantially zero value. By controlling the rate of decrease of the current through the second snubber inductor Lr, the losses associated with a reverse recovery condition of the rectifier diode D may be reduced. When the current through the second snubber inductor Lr reaches a substantially zero value, the rectifier diode D transitions to a nonconducting state. The energy remaining in the second snubber inductor Lr is then recovered through the second snubber diode Da2 to the snubber capacitor Cr.

When the power switch Q is subsequently turned OFF (at some predetermined duty ratio), the first and second snubber diodes Da1, Da2 carry the current of the input inductor Lin to the output of the power converter 100. The energy stored in the snubber capacitor Cr discharges to the output thereby causing the current through the second snubber diode Da2 to flow through the snubber inductor Lr. As this portion of the operation concludes, the rectifier D begins to conduct and the first and second snubber diodes Da1, Da2 transition to a nonconducting state.

The switch drive controller includes a drive circuit 120 and a voltage conditioning circuit (in this particular case, a voltage reduction circuit) 130. The drive circuit 120 includes a control voltage input 125 that is coupled to the PWM signal generator 140. The drive circuit 120 also includes first and second gate drivers U1, U2 that are coupled to the power switch Q1 and the auxiliary switch Qa, respectively. It should be readily apparent to those skilled in the art that the first and second gate drivers U1, U2 are conventional drive circuits such as buffers. Additionally, while specific embodiments of the drive and voltage conditioning circuits will herein be illustrated and described, other embodiments are well within the broad scope of the present invention.

The drive circuit further includes a drive switch Q1 [e.g., a field-effect transistor (FET)] that is coupled via a third diode CR3 to the input of the second gate driver U2. The drive switch Q1 is also coupled to the input of the first gate driver U1 (at a node designated V1) via a second diode CR2. A first diode CR1 and a fourth diode CR4 couple the control voltage input 125 to the inputs of the first and second gate drivers U1, U2, respectively. Additionally, first and sixth resistors R1, R6 couple a bias voltage Vccp to the first and second gate drivers U1, U2, respectively. A voltage divider including third and fourth resistors R3, R4 reduces the bias voltage Vccp at a node designated V2 at the gate terminal of the drive switch Q1 while a second resistor R2 ties the drain terminal of the drive switch Q1 to the bias voltage Vccp. The node V2 is also coupled to a node X, in the voltage reduction network 130, via a fifth resistor R5 and a fifth diode CR5.

In the illustrated embodiment, the voltage reduction circuit 130 includes seventh and eight resistors R7, R8 configured in a voltage divider arrangement across the power switch Q. The voltage reduction circuit 130 reduces the effect of the ON voltage, i.e., drain-source voltage, of the power switch Q on the operation of the drive circuit. The reduction of the voltage across the power switch Q, prior to its introduction in the drive circuit 120, not only reduces its effects on the drive circuit 120, but also allows the use of a single transistor, i.e., drive switch Q1, thus reducing the complexity and cost of the switch drive controller.

The operation of the switch drive controller will be described in greater detail with reference to FIG. 2 and with continuing reference to FIG. 1.

Figure 2:
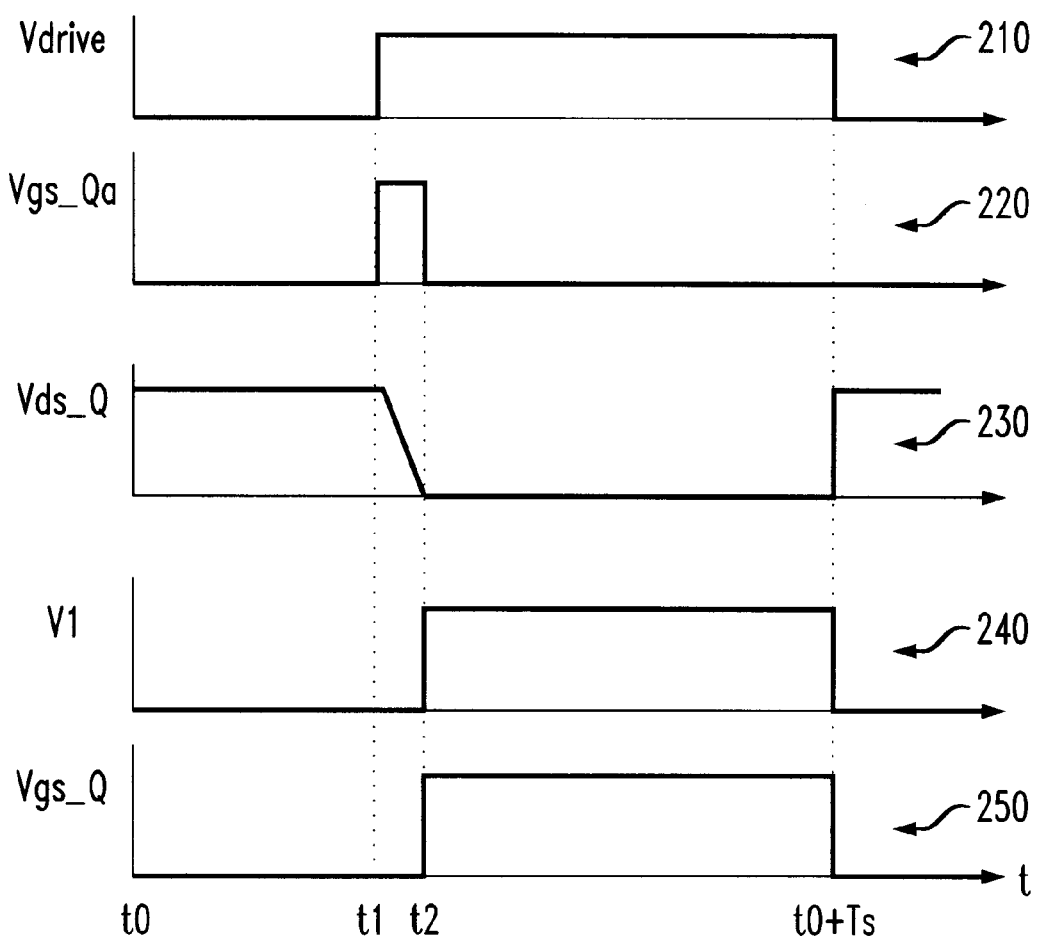
FIG. 2 illustrates exemplary timing diagrams of selected voltages and drive signals of the power converter illustrated in FIG. 1.

Turning now to FIG. 2, illustrated are exemplary timing diagrams of selected voltages and drive signals of the power converter 100 illustrated in FIG. 1. Specifically, a first signal 210 depicts the PWM signal Vdrive provided to the control voltage input 125 by the PWM signal generator 140. Second, third, fourth and fifth signals 220, 230, 240, 250 illustrate the gatesource voltage (Vgs) of the auxiliary switch Qa, the drain-source voltage (Vds) of the power switch Q, the voltage applied to the input of the gate driver U1 and the gate-source voltage (Vgs) of the power switch Q, respectively.

Prior to the initiation of a PWM pulse at time t1, the first and second gate drivers U1, U2 are pulled low by the first and fourth diodes CR1, CR4 resulting in the non-conduction of both the power and auxiliary switches Q, Qa. The fifth diode CR5 is also reversed biased since the drain-source voltage Vds of the power switch Q is high, which also turns the driver switch Q1 ON, i.e., conducting. It should be noted that when the fifth diode CR5 is reversed biased, the voltage at node V2 may be set to 5 volts, for instance, by proper selection of the third and fourth resistors R3, R4.

At time t1, the PWM signal Vdrive goes high reverse biasing the fourth diode CR4. Concurrently, the third diode CR3 is also reverse biased and the voltage input to the second gate driver U2 is driven high. Since the drain-source voltage Vds of the power switch Q is still high, the fifth diode CR5 remains reverse biased keeping the driver switch Q1 conducting. With the driver switch Q1 conducting, the second diode CR2 is forward biased which keeps the input voltage to the first gate driver U1 low. With the input voltages to the first gate driver U1 low and second gate driver U2 high, respectively, the auxiliary switch Qa is driven into a conducting state coincident with the leading edge of the PWM signal Vdrive and the power switch Q remains non-conducting.

With the auxiliary switch Qa conducting, the drain-source voltage Vds of the power switch Q is reduced to substantially zero at time t2. When the voltage at the node X is below the voltage at the node V2, the fifth diode CR5 is biased conducting, i.e., forward biased. At this time, the input voltage to the second gate driver U2 is pulled low also causing the gate voltage of the driver switch Q1 to decrease and bias it non-conducting. The voltage at node V2 may be set to 2 volts or less, for instance, by design, using the following relationship:

$$V2 = Vccp \times [(R5+R7)//R4]/[(R5+R7)//(R4+R3)].$$

With the driver switch Q1 non-conducting, the second diode CR2 is biased non-conducting, i.e., reverse biased, pulling the input voltage to the first gate driver U1 high. With the input voltages to the first and second gate drivers U1, U2 high and low, respectively, the power switch Q is biased conducting while, concurrently, the auxiliary switch Qa is turned OFF. The status of the power and auxiliary switches Q, Qa remain in this condition until the end of the switching cycle, i.e., time Ts, at which time the above described operation of the switch drive controller is repeated.

For a better understanding of power electronics, power converter topologies and snubber circuits, see: *Principles of Power Electronics*, by J. Kassakian and M. Schlecht, Addison-Wesley Publishing Company (1991). The aforementioned reference is herein incorporated by reference.

Although the present invention has been described in detail, those skilled in the art should understand that they can make various changes, substitutions and alterations herein without departing from the spirit and scope of the invention in its broadest form.

What is claimed is:

1. For use with a power converter coupled to a regulation circuit and having a power switch and an auxiliary switch coupled thereto, a controller, comprising:

a voltage conditioning network, parallel-coupled to said power switch, capable of sensing a voltage across said power switch and developing a conditioned voltage; and a drive circuit, coupled to said voltage conditioning network, adapted to provide a drive signal to control said auxiliary switch as a function of said conditioned voltage and a regulation control signal from said regulation circuit.

2. The controller as recited in claim 1 wherein said drive circuit is adapted to provide another drive signal to control said power switch.

3. The controller as recited in claim 1 wherein said drive circuit induces said drive signal to turn on said auxiliary switch before said power switch turns on.

4. The controller as recited in claim 1 wherein said auxiliary switch forms part of a snubber circuit.

5. The controller as recited in claim 1 wherein said voltage conditioning network comprises a voltage divider configuration.

6. The controller as recited in claim 1 wherein said power switch and auxiliary switch are selected from the group consisting of:
    metal-oxide-semiconductor field effect transistors (MOSFETs),
    insulated gate bipolar transistors (IGBTs), and
    gate turn-off thyristors (GTOs).

7. The controller as recited in claim 1 wherein said drive circuit comprises a drive switch coupled to first and second gate drivers of said power switch and said auxiliary switch, respectively.

8. For use with a power converter coupled to a regulation circuit and having a power switch and an auxiliary switch coupled thereto, a method for controlling said auxiliary switch, comprising:
    sensing a voltage across said power switch and developing a conditioned voltage with a voltage conditioning network parallel-coupled to said power switch; and
    generating a drive signal to control said auxiliary switch with a drive circuit coupled to said voltage conditioning network, said drive signal being a function of said conditioned voltage and a regulation control signal from said regulation circuit.

9. The method as recited in claim 8 further comprising generating another drive signal to control said power switch.

10. The method as recited in claim 8 further comprising inducing said drive signal to turn on said auxiliary switch before said power switch turns on.

11. The method as recited in claim 8 wherein said auxiliary switch forms part of a snubber circuit.

12. The method as recited in claim 8 wherein said voltage conditioning network comprises a voltage divider configuration.

13. The method as recited in claim 8 wherein said power switch and auxiliary switch are selected from the group consisting of:
    metal-oxide-semiconductor field effect transistors (MOSFETs),
    insulated gate bipolar transistors (IGBTs), and
    gate turn-off thyristors (GTOs).

14. The method as recited in claim 8 wherein said drive circuit comprises a drive switch and said method comprising coupling said drive switch to first and second gate drivers of said power switch and said auxiliary switch, respectively.

15. A power converter having an input and output, comprising:
    a power switch coupled to said input;
    an auxiliary switch coupled to said power switch;
    a regulation circuit coupled to said power switch and said auxiliary switch; and
    a controller, coupled to said regulation circuit, including:
        a voltage conditioning network, parallel-coupled to said power switch, capable of sensing a voltage across said power switch and developing a conditioned voltage; and
        a drive circuit, coupled to said voltage conditioning network, adapted to provide first and second drive signals to control said power switch and auxiliary switch, respectively, as a function of said conditioned voltage and a regulation control signal from said regulation circuit.

16. The converter as recited in claim 15 wherein said drive circuit induces said drive signal to turn on said auxiliary switch before said power switch turns on.

17. The converter as recited in claim 15 wherein said auxiliary switch forms part of a snubber circuit.

18. The converter as recited in claim 15 wherein said voltage conditioning network comprises a voltage divider configuration.

19. The converter as recited in claim 15 wherein said power switch and auxiliary switch are selected from the group consisting of:
    metal-oxide-semiconductor field effect transistors (MOSFETs),
    insulated gate bipolar transistors (IGBTs), and
    gate turn-off thyristors (GTOs).

20. The converter as recited in claim 15 wherein said drive circuit comprises a drive switch coupled to first and second gate drivers of said power switch and said auxiliary switch, respectively.

* * * * *